United States Patent
Nieten et al.

(10) Patent No.: US 10,942,122 B2
(45) Date of Patent: Mar. 9, 2021

(54) MICROSCOPY METHOD

(71) Applicant: Carl Zeiss Meditec AG, Jena (DE)

(72) Inventors: Christoph Nieten, Jena (DE); Enrico Geissler, Jena (DE); Marco Wilzbach, Aalen (DE); Susanne Kohlhammer, Blaustein (DE)

(73) Assignee: Carl Zeiss Meditec AG, Jena (DE)

( * ) Notice: Subject to any disclaimer, the term of this patent is extended or adjusted under 35 U.S.C. 154(b) by 0 days.

(21) Appl. No.: 16/752,608

(22) Filed: Jan. 24, 2020

(65) Prior Publication Data
US 2020/0240917 A1    Jul. 30, 2020

(30) Foreign Application Priority Data

Jan. 24, 2019  (DE) .................. 10 2019 101 777.7

(51) Int. Cl.
*G01J 3/30*        (2006.01)
*G01N 21/64*    (2006.01)
*G06T 7/90*       (2017.01)

(52) U.S. Cl.
CPC ..... *G01N 21/6458* (2013.01); *G01N 21/6428* (2013.01); *G06T 7/90* (2017.01);
(Continued)

(58) Field of Classification Search
CPC .......... G01N 21/6428; G01N 21/6458; G01N 21/6452; G01N 21/645; G01J 3/4406
(Continued)

(56) References Cited

U.S. PATENT DOCUMENTS

| | | |
|---|---|---|
| 6,640,131 B1 | 10/2003 | Irion et al. |
| 2004/0114219 A1 | 6/2004 | Richardson |

(Continued)

FOREIGN PATENT DOCUMENTS

| | | |
|---|---|---|
| DE | 69822807 B4 | 10/1998 |
| DE | 10362120 C5 | 1/2004 |

(Continued)

OTHER PUBLICATIONS

German Office Action, with translation thereof, for corresponding DE application No. 10 2019 101 777.7 dated Nov. 18, 2019.

(Continued)

*Primary Examiner* — Md M Rahman
(74) *Attorney, Agent, or Firm* — Falk Ewers; Ewers IP Law PLLC (57) ABSTRACT

A microscopy method includes illuminating an object with illumination light, recording a first color image of the illuminated object by a color image sensor suitable for recording colors of a first gamut, producing a second color image of the object, the second color image including pixels that each have assigned a color from a second gamut, depicting the second color image by a display apparatus suitable for rendering colors of the second gamut, wherein the producing the second color image includes determining the colors at the pixels of the second color image by applying a color transfer function to the colors of the corresponding pixels of the first color image, the color transfer function mapping input colors onto output colors, and the color transfer function mapping those input colors that belong to the first gamut but not to the second gamut onto output colors that belong to the second gamut.

19 Claims, 5 Drawing Sheets

(52) U.S. Cl.
CPC ............... *G01N 2021/6423* (2013.01); *G06T 2207/10024* (2013.01); *G06T 2207/10064* (2013.01)

(58) Field of Classification Search
USPC ........................................................ 356/317
See application file for complete search history.

(56) References Cited

U.S. PATENT DOCUMENTS

| | | |
|---|---|---|
| 2010/0135566 A1 | 6/2010 | Joanidopoulos et al. |
| 2011/0164127 A1 | 7/2011 | Stehle et al. |
| 2013/0228704 A1 | 9/2013 | Kalkbrenner |
| 2017/0280029 A1 | 9/2017 | Steiner |

FOREIGN PATENT DOCUMENTS

| | | |
|---|---|---|
| DE | 10304266 B9 | 8/2004 |
| DE | 69822807 T2 | 1/2005 |
| DE | 102008027905 A1 | 12/2009 |
| DE | 102011016094 A1 | 10/2012 |
| DE | 102012202730 A1 | 8/2013 |
| DE | 102008059788 B4 | 3/2018 |
| DE | 202018103032 U1 | 7/2018 |
| EP | 0930843 B1 | 2/2004 |

OTHER PUBLICATIONS

Rollakanti et al., "Techniques for fluorescence detection of protoporphyrin IX in skin cancers associated with photodynamic therapy", Photonics Lasers Med., 2(4), Nov. 1, 2013, pp. 287 to 303, OH, USA.

MICROSCOPY METHOD

CROSS REFERENCE TO RELATED APPLICATIONS

This application claims priority to German patent application DE 10 2019 101 777.7, filed Jan. 24, 2019, the entire content of which is incorporated herein by reference.

TECHNICAL FIELD

The present disclosure relates to a microscopy method for observing fluorescing objects.

BACKGROUND

An object is illuminated with illumination light in conventional microscopy methods. The illumination light is suitable for exciting a fluorescent dye in the object. The fluorescence light absorbs some of the illumination light and emits fluorescence light as a consequence thereof.

Conventionally, the light emanating from the object, said light comprising fluorescence light and reflected illumination light, is imaged into an image plane by a microscopy optical unit. By way of example, the image plane can be the retina of an eye that observes the object. Alternatively, a light image sensor that can record an image of the object can be arranged in the image plane. The recorded image can be processed and can be rendered on a display apparatus such that an observer can look at the recorded (and processed) image of the object.

The variant specified first, in which the microscopy optical unit directly images the object onto the retina of an eye, is referred to as an analogue microscope. The variant specified second, in which the microscopy optical unit images the object onto a light image sensor and the image recorded by the latter is rendered on a display apparatus, is referred to as a digital microscope. A problem only occurring in the case of digital microscopes is that the light image sensor and the display apparatus cannot record and render, respectively, the same color space region (the colors of which are referred to as gamut). Therefore, a question arising is how the colors of the image recorded by the light image sensor can be or must be adapted so that the information contained in the recorded image can be suitably rendered by the display apparatus.

This problem is of particular importance, particularly in the case of microscopy methods that are used to distinguish between diseased and healthy tissue. By way of example, the fluorescent dye protoporphyrin IX (PpIX) is used to mark tumorous tissue. This fluorescent dye accumulates in tumorous, i.e., diseased, tissue. If tissue with accumulations of PpIX is illuminated with illumination light suitable for exciting PpIX, the diseased tissue can be identified on the basis of the emitted fluorescence light.

So that the diseased tissue can be observed in its surroundings of healthy tissue, some of the reflected illumination light is conventionally also imaged into the image plane. The image of the object produced in the image plane therefore, by approximation, only contains those colors that arise from the mixture of the illumination light with the fluorescence light.

However, the distinction between diseased tissue and healthy tissue is particularly difficult when a region of the image has a color that is an approximately equally weighted mixture of reflected illumination light and fluorescence light. Since, as a rule, digital microscopes can record a color space that is smaller than the color space representable by analogue microscopes, the distinction is made more difficult if digital microscopes are used.

SUMMARY

It is an object of the present disclosure to provide a microscopy method for digital microscopes that maintain the color impression known from analogue microscopes to the best possible extent but nevertheless facilitate a better differentiation between healthy and diseased tissue using a fluorescent dye that can emit fluorescence light in the visible wavelength range from approximately 380 nm to 750 nm.

A microscopy method according to the disclosure includes the illumination of an object with illumination light such that a fluorescent dye in the object is excited to fluoresce, the recording of a first color image of the illuminated object by a color image sensor, the production of a second color image of the object based on the recorded first color image, and the depiction of the second color image by a display apparatus. By way of example, the fluorescent dye can be protoporphyrin IX.

The color image sensor is configured to record an image. The color image sensor produces raw image data that represent the recorded image. By way of example, the raw image data includes a plurality of pixels, which each have assigned a value triplet (for example, a value triplet for the raw colors of red, green, blue; referred to below as an RGB value triplet).

The first color image is produced by applying a calibration rule to the raw data. The first color image includes a plurality of pixels, which each have assigned a color from a first gamut. Gamut refers to a restricted set of colors. Accordingly, a pixel represents a location within the first color image, wherein the first color image only has colors of the first gamut. The first gamut is set by the calibration rule.

The colors of the first gamut or the color points of these colors, which are assigned to the pixels of the first color image, are obtained, for example, by multiplying the RGB value triplets (raw image data) by a calibration matrix. From this, a color of the first gamut or a color point, which uniquely defines this color in a color space, is determined from each RGB value triplet.

By way of example, the calibration rule is determined with the aid of test targets with a known color and a known illumination. The calibration rule is determined in such a way that the calibration rule assigns to the raw image data of the test targets those colors that correspond to the known colors thereof. The calibration rule can be determined in such a way that the particularly relevant colors are mapped with a particularly high accuracy. By way of example, the calibration rule is determined in such a way that dominant colors in the excitation and emission of protoporphyrin IX are mapped with particularly high accuracy to the colors of the first gamut.

The second color image includes pixels, which each have assigned a color. The colors of the second color image, i.e., the colors that are assigned to the pixels of the second color image, belong to the second gamut. The second gamut is the gamut of the display apparatus, by which the second color image is rendered. Accordingly, the display apparatus is suitable for rendering colors of the second gamut. In particular, the display apparatus is only suitable for rendering colors of the second gamut; i.e., the display apparatus cannot represent colors that do not belong to the second gamut.

According to an aspect of the disclosure, the second color image is produced based on the first color image. In particular, producing the second color image includes the determination of the colors at the pixels of the second color image by applying a color transfer function to the colors of the corresponding pixels of the first color image. Corresponding pixels in the first and second color image represent the same location of the object.

The color transfer function maps input colors onto output colors. This means that an output color is obtained by virtue of the transfer function being applied to an input color. The color transfer function is applied to the colors of the first color image (input colors), as result of which the colors of the second color image (output colors) are obtained. By way of example, the color at a first pixel of the second color image is determined by virtue of the color transfer function being applied to the color of the pixel of the first color image that is the pixel corresponding to the first pixel of the second color image; the color at a second pixel of the second color image is determined by virtue of the color transfer function being applied to the color of the pixel of the first color image that is the pixel corresponding to the second pixel of the second color image; etc.

The color transfer function may have one or more of the properties described below.

The color transfer function can map those input colors that belong to the first gamut but not to the second gamut onto output colors that belong to the second gamut. In this case, the color image sensor can record colors that cannot be rendered by the display apparatus because these colors belong to the first gamut (color image sensor) but not to the second gamut (display apparatus). The color transfer function maps such colors onto colors that belong to the second gamut (display apparatus). Accordingly, an information item encoded in a color belonging to the first gamut but not to the second gamut can nevertheless be rendered in the second color image by the display apparatus.

The color transfer function can map a first subset of the input colors onto a first subset of the output colors in hue-maintaining fashion. This means that an input color and the output color obtained by applying the color transfer function to this input color have substantially the same hue. Accordingly, the color transfer function can map a first subset of the input colors onto a first subset of the output colors in hue-maintaining fashion, wherein a hue-maintaining mapping is characterized in that an input color is mapped onto an output color with substantially the same hue.

In particular, the first subset of the input colors (only) includes colors that belong to the first gamut but not to the second gamut. In particular, the first subset of the output colors (only) includes colors that belong to the second gamut.

According to develop the definition of the hue-maintaining mapping, the hue-maintaining mapping maps an input color onto an output color in such a way that the color point of the output color in the CIE (Commission Internationale de l'Éclairage, French for International Commission on Illumination) 1976 UCS (Uniform Color Scale) u'v' chromaticity diagram has a distance of no more than twenty times a limit, in particular no more than ten times a limit or no more than three times a limit, from a straight line which passes through the color point of a predetermined white point (for example, white point D50) and the color point of the input color, wherein the limit $\Delta u'v'_{limit}$ is 0.003. The limit $\Delta u'v'_{limit}$ defines a distance in the CIE 1976 UCS u'v' chromaticity diagram, which is defined as $$\Delta u'v' = \sqrt{u'^2 + v'^2} \text{ with}$$

$$\Delta u' = |u'_1 - u'_2| \text{ and}$$

$$\Delta v' = |v'_1 - v'_2|,$$

where $u'_1$ and $v'_1$ are coordinates of a color point of a first color and $u'_2$ and $v'_2$ are coordinates of a color point of a second color in the CIE 1976 UCS u'v' chromaticity diagram.

The colors along the straight line that passes through the color point of the predetermined white point and the color point of the input color are perceived as colors with the same hue by a standard observer. Two colors cannot be distinguished by the standard observer if the color distance is $\Delta u'v' \leq 0.003$.

According to develop the definition of the hue-maintaining mapping, the hue-maintaining mapping further maps an input color onto an output color in such a way that the color point of the output color in the CIE 1976 UCS u'v' chromaticity diagram is a point of intersection of an edge of the second gamut with the straight line that passes through the predetermined white point and the color point of the input color. Accordingly, the output color has the lowest possible desaturation (large distance from the white point) and nevertheless substantially the same hue as the input color.

The hue-maintaining mapping is particularly suitable for those colors of the first color image whose meaning is of particular importance in regard to the distinction between diseased and healthy tissue. In particular, these are colors that are predominantly produced by reflected illumination light, colors that are predominantly produced by fluorescence light and colors that are produced by an approximately equally weighted mixture of reflected illumination light and fluorescence light. These colors and the hue-maintaining mapping thereof are defined by a reference color.

The color transfer function can map at least one input color in hue-maintaining fashion, the color point of said input color having a distance of no more than 0.2, in particular no more than 0.15, further particularly no more than 0.1, in the CIE 1976 UCS u'v' chromaticity diagram from the color point of a reference color. Accordingly, one/more color/s is/are mapped in hue-maintaining fashion, the color point/color points of which in the CIE 1976 UCS u'v' chromaticity diagram lies/lie in the vicinity of the color point of the reference color.

By way of example, the reference color has a color point in the CIE 1976 UCS u'v' chromaticity diagram with coordinates $u'_{ref}$ and $v'_{ref}$, which are determinable by:

$$u'_{ref} = \frac{4x}{-2x + 12y + 3} \text{ and}$$

$$v'_{ref} = \frac{9y}{-2x + 12y + 3},$$

where x and y represent coordinates of the CIE 1931 standard chromaticity diagram, which are determinable by:

$$x = \frac{X}{X + Y + Z} \text{ and}$$

$$y = \frac{Y}{X + Y + Z},$$

where X, Y and Z represent tristimulus values of the CIE 1931 standard valence system, which are determinable by:

$$X = k \int A(\lambda) \cdot \bar{x}(\lambda) \cdot d\lambda,$$

$$Y = k \int A(\lambda) \cdot \bar{y}(\lambda) \cdot d\lambda, \text{ and}$$

$$Z = k \int A(\lambda) \cdot \bar{z}(\lambda) \cdot d\lambda,$$

where $A(\lambda)$ represents a wavelength-dependent quantity, $\bar{x}(\lambda)$, $\bar{y}(\lambda)$, and $\bar{z}(\lambda)$ represent the spectral value function of the CIE 1931 standard valence system and k represents a constant. The integrals over the wavelength $\lambda$ are integrated from 380 nm to 780 nm.

In a first case, the quantity $A(\lambda)$ represents the product of the spectrum of the illumination light with the transmittance of an illumination filter and with a transmittance of an observation filter. In this case, the reference color is an approximation for the color of illumination light that is reflected at non-fluorescing locations of the object. The coordinates of this reference color are referred to as $u'_{NF}$ and $v'_{NF}$.

In a second case, $A(\lambda)$ represents the product of the emission spectrum of the fluorescent dye with the transmittance of the observation filter. In this case, the reference color is an approximation for the color that can be observed at strongly fluorescing locations of the object. The coordinates of this reference color are referred to as $u'_F$ and $v'_F$.

In a third case, the reference color is defined by the coordinates $u'_M$ and $v'_M$ of its color point, where $u'_M$ is the arithmetic mean of $u'_F$ and $u'_{NF}$, and where $v'_M$ is the arithmetic mean of $v'_F$ and $v'_{NF}$. In this case, the reference color is an approximation for a color produced by an approximately equally weighted mixture of reflected illumination light and fluorescence light.

The following reference colors are of particular interest for PpIX:

By way of example, the reference color corresponds to a spectral color with a wavelength of between 425 nm and 460 nm. In particular, the reference color can correspond to a spectral color with a wavelength of 430 nm or 455 nm. Spectral colors lie on the spectral locus. Accordingly, colors of the first color image that are dominantly produced by reflected illumination light are mapped in hue-maintaining fashion onto colors of the second color image.

By way of example, the reference color corresponds to spectral color with a wavelength of 635 nm. Accordingly, colors of the first color image that are dominantly produced by fluorescence light around 635 nm are mapped in hue-maintaining fashion onto colors of the second color image.

Further, the color transfer function can map at least one input color in hue-maintaining fashion, said input color having a complementary wavelength of between 495 nm and 575 nm, in particular of between 510 nm and 570 nm, further particularly of between 540 nm and 560 nm. Accordingly, colors in the first color image that are produced by an approximately equally weighted mixture of reflected illumination light and fluorescence light are mapped in hue-maintaining fashion onto colors of the second color image.

A limited set of colors is uniquely defined by specifying a complementary wavelength. This relates to those colors whose color points in the CIE 1976 UCS u'v' chromaticity diagram lie on a straight line between a white point (e.g., white point D50) and the purple line, said straight line passing through the color point of the white point and the color point of the spectral color with the complementary wavelength.

The color transfer function can map a second subset of the input colors onto a second subset of the output colors, wherein the number of distinguishable colors in the second subset of the output colors is larger than or equal to the number of distinguishable colors in the second subset of the input colors. The color space region assumed by the second subset of the input colors is smaller than the color space region assumed by the second subset of the output colors.

As a result, colors in the first color image that are critical for the distinction between diseased and healthy tissue are rendered by better distinguishable colors in the second color image than in the first color image.

According to an alternative definition, the color transfer function maps a second subset of the input colors onto a second subset of the output colors in such a way that a mean value for the distance between color points of mutually closest colors of the second subset of the output colors is greater than or equal to a mean value for the distance between color points of mutually closest colors of the second subset of the input colors.

According to an alternative definition, the color transfer function can map a second subset of the input colors onto a second subset of the output colors in such a way that the number of distinguishable colors in the second subset of the output colors is larger than the number of distinguishable colors in the second subset of the input colors.

In particular, the second subset of the input colors (only) includes colors that meet the following two conditions: Firstly, the complementary wavelengths of these colors lie between 510 nm and 570 nm. Secondly, the color points of these colors lie in a dominant color space region. The dominant color space region is bounded by the spectral locus of the CIE 1976 UCS u'v' chromaticity diagram from 620 nm to 700 nm and from 430 nm to 470 nm, by a straight connecting line, the endpoints of which correspond to the color points of the spectral colors of 620 nm and 470 nm on the spectral locus of the CIE 1976 UCS u'v' chromaticity diagram, and by a straight connecting line, the endpoints of which correspond to the color points of the spectral colors of 430 nm and 700 nm on the spectral locus of the CIE 1976 UCS u'v' chromaticity diagram.

Accordingly, the second subset of the input colors includes those colors that are to be expected for the fluorescent dye PpIX by an approximately equally weighted mixture of reflected illumination light and fluorescence light.

Colors that are dominated either by excitation light or by fluorescence light are non-critical for the distinction between diseased and healthy tissue. If the color of a pixel is dominated by excitation light, it is easy to make the decision that this location relates to healthy tissue. If the color at a pixel is dominated by fluorescence light, it is easy to make the decision that this location relates to diseased tissue. Accordingly, the colors whose assessment is noncritical can be represented in the second color image by fewer (distinguishable) colors or by a smaller color space region than in the first color image.

Accordingly, the color transfer function can map a third subset of the input colors onto a third subset of the output colors, wherein the number of distinguishable colors in the third subset of the output colors is less than the number of distinguishable colors in the third subset of the input colors.

According to an alternative definition, the color transfer function can map a third subset of the input colors onto a third subset of the output colors in such a way that a mean value for the distance between color points of mutually closest colors of the third subset of the output colors is less than a mean value for the distance between color points of mutually closest colors of the third subset of the input colors.

According to an alternative definition, the color transfer function can map a third subset of the input colors onto a third subset of the output colors in such a way that the number of distinguishable colors in the third subset of the output colors is less than the number of distinguishable colors in the third subset of the input colors.

In this way, the color space region assumed by the colors of the third subset of the output colors is reduced in comparison with the color space region assumed by the colors of the third subset of the input colors.

In particular, the color transfer function can map a plurality of colors of the third subset of the input colors onto one same output color of the third subset of the output colors. As a result, a number of different input colors are mapped onto one same output color by the color transfer function. As a further result, regions are "saved" in the color space region of the output colors, which regions can thereupon be used for the second subset of the output colors.

In particular, the third subset of the input colors (only) includes colors that meet the following two conditions: Firstly, the complementary wavelengths of these colors are less than 510 nm or greater than 570 nm. Secondly, the color points of these colors lie in the dominant color space region, which was defined above.

The color transfer function can map the input colors onto the output colors in such a way that the number of distinguishable output colors is less than the number of distinguishable input colors.

The first color image can include colors that belong to the first gamut but not to the second gamut. In particular, the first color image can (only) comprise colors whose color points lie in the dominant color space region.

When PpIX is used, in particular, the microscopy method may further include: filtering the illumination light by an illumination filter, the mean transmittance of which between 400 nm and 430 nm is at least 50% and the mean transmittance of which between 470 nm and 700 nm is at most 1%, and filtering light, which emanates from the illuminated object and is guided to the color image sensor, by an observation filter, the mean transmittance of which between 400 nm and 430 nm is at most 1% and the mean transmittance of which between 470 nm and 700 nm is at least 50%.

As a result of the illumination filter, the illumination light predominantly has those wavelengths that are suitable for exciting PpIX. In particular, the illumination light striking the object has a very low intensity in the spectral range of the PpIX emission, and so the fluorescence light is not swamped by reflected illumination light at this wavelength.

The observation filter blocks the majority of illumination light reflected at the object and predominantly has a high transmittance at those wavelengths at which PpIX produces fluorescence light.

However, the illumination filter and observation filter are matched to one another in such a way that a small amount of the reflected illumination light is transmitted through the observation filter such that the surroundings of fluorescing object regions can also be observed.

When the above-described set of filters, including the illumination filter and the observation filter, is applied, the first color image substantially only has those colors whose color points lie in the dominant color space region.

The fluorescent dye can be suitable for producing fluorescence light in the visible wavelength range, in particular in the wavelength range between 600 nm and 750 nm, following excitation.

According to an exemplary embodiment, the input colors lie on a curved line or a straight line in the CIE 1976 UCS u'v' chromaticity diagram and/or the output colors lie on a curved line or a straight line in the CIE 1976 UCS u'v' chromaticity diagram.

The color transfer function can map the input colors onto the output colors in such a way that the saturation of the output colors is approximately the same. By way of example, the saturation can be defined as the ratio of a first distance to a second distance, wherein the first distance denotes the distance of the color point of the white point from the color point of an output color while the second distance specifies the distance between the color point of the white point and the color point of the input color, which is mapped onto the output color by the color transfer function. In particular, the color transfer function maps the input colors onto the output colors in such a way that the saturations of the output colors differ from one another by no more than 20%, typically by no more than 10% or by no more than 5%.

By way of example, the observation filter and illumination filter described herein may be embodied as interference filters. Interference filters in a plurality of layers of materials with different optical properties, for example different refractive indices. Each layer can have a different thickness. Depending on the filter requirements, the number of layers may lie between a few and several hundred. The specific choice of the thickness and the optical properties of each layer allows the transmittances described herein to be realized.

Auxiliary means for determining the thicknesses and optical properties of the layers of a filter on the basis of a predefined wavelength-dependent transmittance are known. The design of such layer sequences can be implemented with simulation programs that use the optical properties (refractive index and absorption as a function of the wavelength, dispersion) of the materials to be used and the desired transmission spectrum or reflection spectrum as input data. The simulation program outputs the simulated transmission spectrum or reflection spectrum and the layer sequence or the thickness of the layers, and the employed optical properties or materials. The calculation can be implemented in an iterative method. This allows the design and production even of filters with complicated requirements, e.g., multi-band filters.

BRIEF DESCRIPTION OF THE DRAWINGS

The disclosure will now be described with reference to the drawings wherein.

DESCRIPTION OF EXEMPLARY EMBODIMENTS

Figure 1:
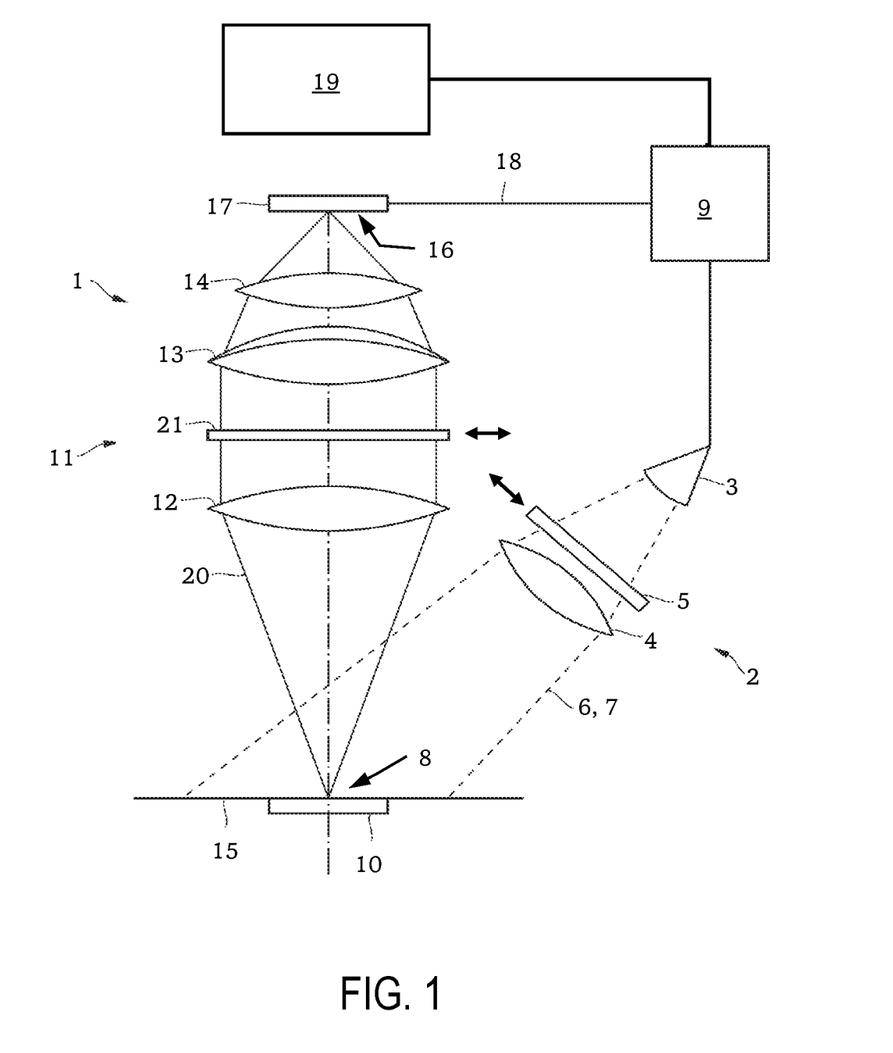
FIG. 1 shows a schematic illustration of a microscopy system.

FIG. 1 shows a schematic illustration of a microscopy system 1 for fluorescence observation. The microscopy system 1 includes an illumination apparatus 2. The illumination apparatus 2 includes a light source 3, an illumination optical unit 4 and an illumination filter 5, which can selectively be arranged within or outside of an illumination beam path 6 that is formed by the illumination optical unit 4. In FIG. 1, this is represented by double-headed arrow. The illumination apparatus 2 can produce illumination light 7 by the light source 3 and the illumination filter 5 and can direct said illumination light 7 on an object region 8. By way of example, the light source 3 is a narrow-band light-emitting diode, which emits light between 400 nm and 450 nm.

The microscopy system 1 includes a controller 9 configured to control the illumination apparatus 2.

The illumination apparatus 2 directs illumination light 7 onto the object region 8 by way of the illumination beam path 6, an object 10 to which a fluorescent dye may have been added being able to be arranged in said object region. The fluorescent dye supplied to the object 10 accumulates significantly in some regions of the object 10 (fluorescing regions). By way of example, these regions contain tumor cells, to which the fluorescent dye binds. In other regions of the object 10, the fluorescent dye does not accumulate or only accumulates in small quantities (non-fluorescing regions). By way of example, these regions contain no tumor cells. By way of example, the fluorescent dye is protoporphyrin IX (PpIX).

The microscopy system 1 further includes a microscopy optical unit 11, which includes an objective lens 12 and further lenses 13 and 14 in the present example. The microscopy optical unit 11 is configured to image the object region 8, in particular an object plane 15, onto an image plane 16. In the present example, a detection surface of a color image sensor 17 of the microscopy system 1 is arranged in the image plane 16. The color image sensor 17 outputs a signal 18 that represents a color image recorded by the color image sensor 17. The color image sensor 17 is connected to the controller 9 and the control 9 receives the signal 18 output by the color image sensor 17 from the latter. The controller 9 can process the image produced by the color image sensor 17 and can display said image on a display apparatus 19.

The microscopy optical unit 11 provides an observation beam path 20, which images the object plane 15 onto the image plane 16. An observation filter 21 can be selectively arranged within or outside of the observation beam path 20, which is represented by a double-headed arrow.

Figure 2:
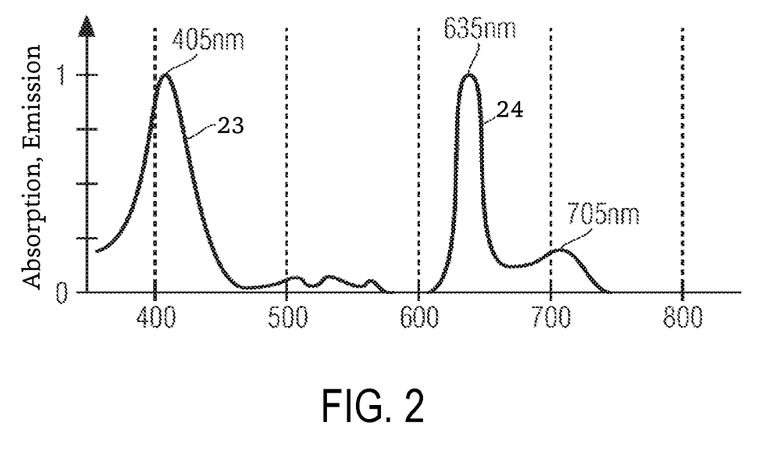
FIG. 2 shows a schematic illustration of a normalized absorption spectrum and emission spectrum of the fluorescent dye PpIX.

FIG. 2 shows a schematic illustration of the wavelength-dependent absorption spectrum 23 of PpIX and of the wavelength-dependent emission spectrum 24 of PpIX, normalized to their respective maximum values. The fluorescent dye PpIX can be efficiently excited in the wavelength range from 350 nm to 430 nm. The fluorescent dye PpIX has the maximum of the absorption at approximately 405 nm. The fluorescent dye PpIX emits fluorescence light in a spectral range from approximately 600 nm to 750 nm, with a main maximum of the emission intensity lying at 635 nm and a secondary maximum lying at approximately 705 nm.

Figure 3:
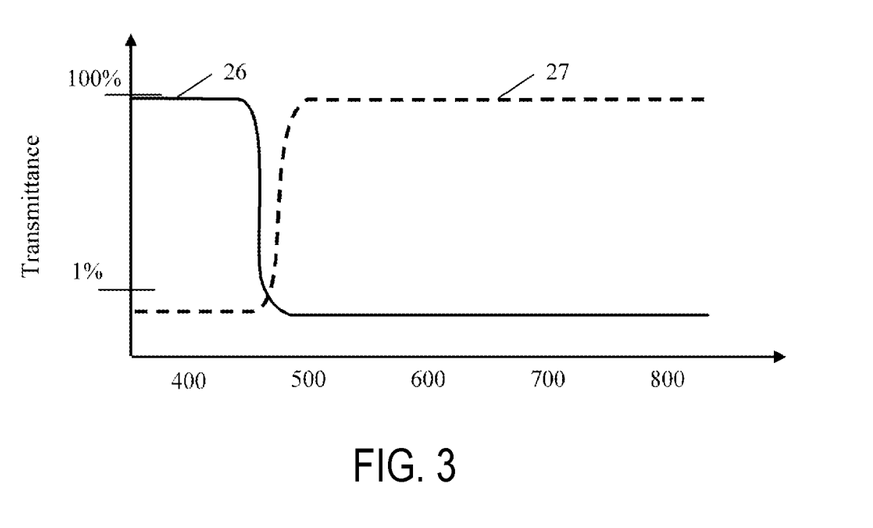
FIG. 3 shows a schematic illustration of the transmittance of an illumination filter and of an observation filter.

FIG. 3 shows a schematic illustration of the transmittance 26 of the illumination filter 5 and of a transmittance 27 of the observation filter 21.

The transmittance 26 of the illumination filter 5 is roughly 100% from approximately 350 nm to approximately 430 nm. The transmittance 26 falls to less than 1% between 430 nm and 470 nm and remains below 1% up to the long-wavelength end of the visible wavelength range.

The transmittance 27 of the observation filter 21 is less than 1% from approximately 350 nm to 430 nm, increases to roughly 100% from approximately 430 nm to 470 nm and remains at roughly 100% up to the long-wavelength end of the visible wavelength range.

This allows efficient excitation of PpIX and the fluorescence light between approximately 600 nm and 750 nm can be efficiently observed. Moreover, the surroundings of fluorescing regions of the object 10 can be observed since illumination light with wavelengths of between 430 nm and 470 nm, reflected at the object 10, is transmitted through the observation filter 21 to a sufficient extent. Accordingly, light of the wavelength range between 430 nm and 470 nm and also between 600 nm and 750 nm predominantly strikes the light image sensor 17 when the illumination filter 5 with the transmittance 26 and the observation filter 21 with the transmittance 27 are applied. Accordingly, the color image recorded by the light image sensor 17 is dominated by blue and red colors and the mixtures thereof. This dominant color space region is illustrated in FIG. 4 as color space region 39.

Figure 4:
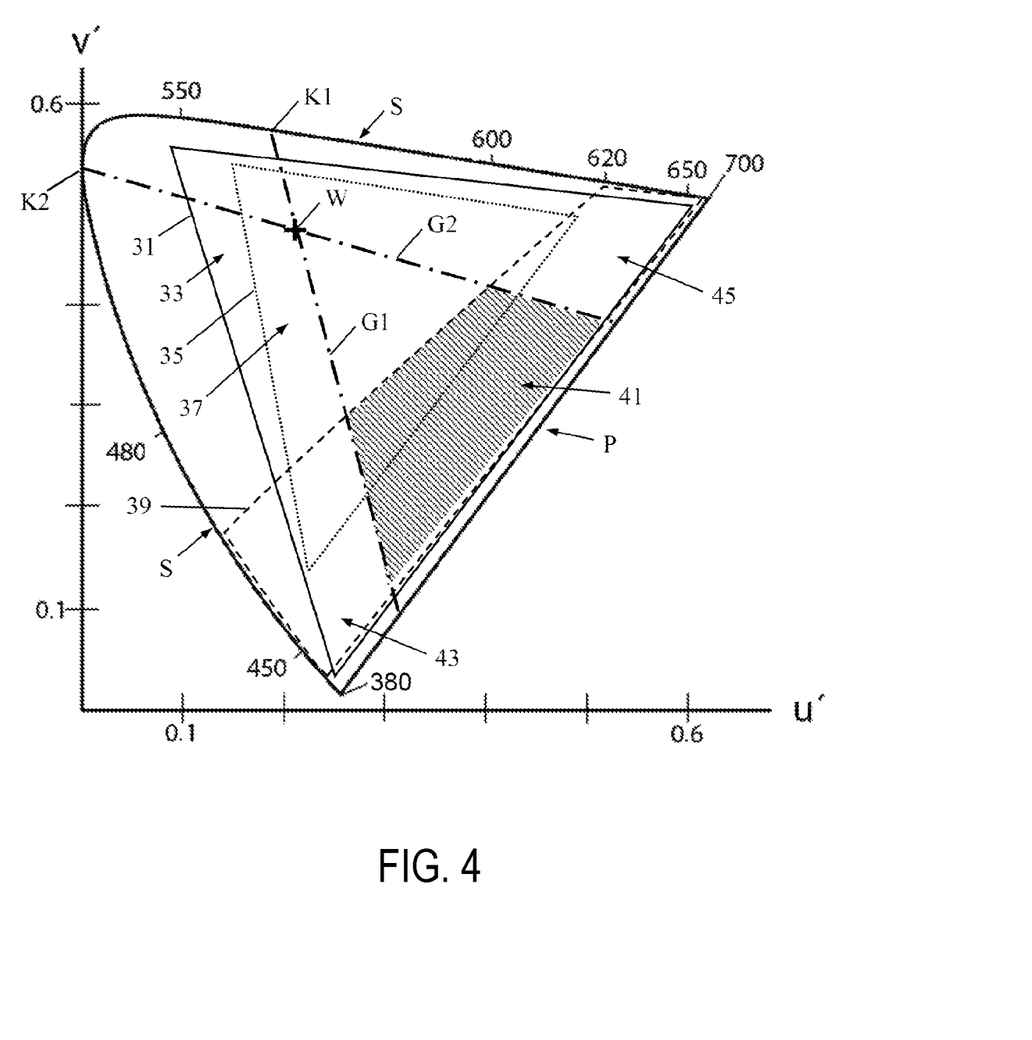
FIG. 4 shows a schematic illustration of a CIE 1976 UCS u'v' chromaticity diagram for explaining a first and second gamut, a dominant color space region and the concept of complementary colors.

FIG. 4 shows a schematic illustration of a CIE 1976 UCS u'v' chromaticity diagram. Plotted therein are the spectral locus S and the purple line P, which together define the set of colors visible to the standard observer. Colors visible to the standard observer have color points that lie within the region of the u'v'-plane that is bounded by the spectral locus S and the purple line P.

A cross specifies the color point of a white point W, for example the color point of the white point D50.

A triangle 31, illustrated using solid lines, represents the edge of a first gamut 33. The first gamut 33 denotes the set of all colors whose color points are covered by the triangle 31, i.e., which lie within the triangle 31 or on the edge of the triangle 31. The color image sensor 17 (cf. FIG. 1) is suitable for recording colors of the first gamut 33. Accordingly, the color image recorded by the color image sensor 17 may contain (only) colors of the first gamut 33.

A triangle 35, illustrated using dotted lines, represents the edge of a second gamut 37. The second gamut 37 denotes the set of all colors whose color points are covered by the triangle 35, i.e., which lie within the triangle 35 or on the edge of the triangle 35. The display apparatus 19 (cf. FIG. 1) is suitable for rendering colors of the second gamut 37. Accordingly, the color image rendered by the display apparatus 19 may contain (only) colors of the second gamut 37.

In the present example, the triangle 35 of the second gamut 37 (display apparatus) is contained completely within the triangle 31 of the first gamut 33 (color image sensor). This means that the display apparatus 19 can only depict a part of the first gamut 33. In general, the first gamut 33 and the second gamut 37 differ from one another.

For the fluorescence observation of PpIX, all colors whose color points lie in a dominant color space region 39 are of particular interest. In FIG. 4, the dominant color space region 39 is bounded by a dashed line. The dominant color space region 39 is bounded by the spectral locus of the CIE 1976 UCS u'v' chromaticity diagram from 620 nm to 700 nm and from 430 nm to 470 nm, by a straight connecting line, the endpoints of which correspond to the color points of the spectral colors with wavelengths of 620 nm and 470 nm on the spectral locus of the CIE 1976 UCS u'v' chromaticity diagram, and by a straight connecting line, the endpoints of which correspond to the color points of the spectral colors with wavelengths of 430 nm and 700 nm on the spectral locus of the CIE 1976 UCS u'v' chromaticity diagram.

Color sets can be defined by their complementary wavelength. A complementary wavelength K1 at approximately 570 nm, shown in FIG. 4, represents the set of colors whose color points between the color point of the white point W and the purple line P lie along a straight line G1, which passes through the color point of the white point W and the color point of the spectral color of wavelength K1. A further complementary wavelength K2 at approximately 510 nm, shown in FIG. 4, represents the set of colors whose color points between the color point of the white point W and the purple line P lie along a straight line G2, which passes through the color point of the white point W and the color point of the spectral color of wavelength K2.

Colors whose color points lie within the dominant color space region 39 and which moreover have a complementary wavelength between 510 nm and 570 nm are particularly critical for the distinction between diseased and healthy tissue when PpIX is applied, and are labelled in FIG. 4 by a hatched region 41.

Colors whose color points lie within the color space region 39 and which moreover have a complementary wavelength that is less than 510 nm or greater than 570 nm are easy to distinguish for the distinction between diseased and healthy tissue when PpIX is applied, and are labelled in FIG. 4 by regions 43 and 45.

Figure 5:
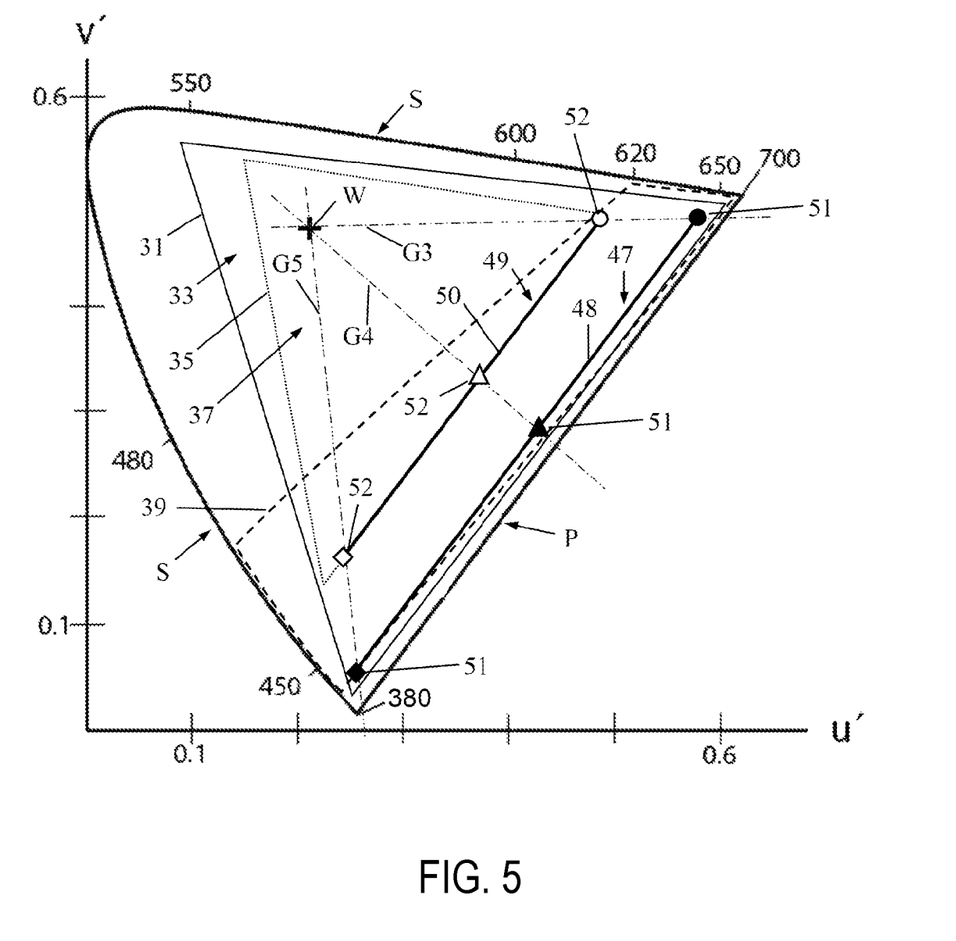
FIG. 5 shows a schematic illustration of a CIE 1976 UCS u'v' chromaticity diagram for explaining properties of a color transfer function.

FIG. 5 shows a schematic illustration of the CIE 1976 UCS u'v' chromaticity diagram. Various properties of a color transfer function are explained with reference to FIG. 5.

The color transfer function maps input colors 47 onto output colors 49. By way of example, the color transfer function maps the input colors 47 labelled by a line 48 onto output colors 49 labelled by a line 50. The line 48 represents the set of colors that are mapped by the color transfer function. The line 50 represents the set of colors onto which the input colors 47 are mapped by the color transfer function. The lines 48, 50 can be straight lines or curved curves.

The input colors 47 are contained in the first gamut 33 but not in the second gamut 37. The output colors 49 are contained in the second gamut 37. Accordingly, the color transfer function of this example maps input colors 47 that belong to the first gamut 33 but not to the second gamut 37 onto output colors 49 that belong to the second gamut 37.

The color transfer function presented in FIG. 5 has a further property. A first subset 51 of the input colors 47 labelled by the line 48 are mapped by the color transfer function in hue-maintaining fashion onto a first subset 52 of the output colors 49 labelled by the line 50. The input labels labelled by a filled circle, a filled triangle and a filled rhombus form the first subset 51 of the input colors. Accordingly, the first subset 51 of the input colors contains three colors, the color points of which are labelled by the filled circle, the filled triangle and the filled rhombus.

The input color labelled by the filled circle is mapped by the color transfer function onto the output color labelled by a hollow circle. The input color labelled by the filled triangle is mapped by the color transfer function onto the output color labelled by a hollow triangle. The input color labelled by the filled rhombus is mapped by the color transfer function onto the output color labelled by a hollow rhombus.

By way of example, the hue-maintaining mapping is defined in such a way that an input color 47 (filled circle, filled triangle, filled rhombus) is mapped onto an output color 49 (hollow circle, hollow triangle, hollow rhombus) in such a way that the color point of the output color 49 (hollow circle, hollow triangle, hollow rhombus) in the CIE 1976 UCS u'v' chromaticity diagram has a distance that is less than a predetermined limit value from a straight line which passes through the color point of the white point W and the color point of the input color 47 (filled circle, filled triangle, filled rhombus).

Accordingly, the input color labelled by the filled circle is (approximately) mapped onto a color whose color point lies on a straight line G3, wherein the straight line G3 passes through the color point of the white point W and the color point of the input color labelled by the filled circle; the input color labelled by the filled triangle is (approximately) mapped onto a color whose color point lies on a straight line G4, wherein the straight line G4 passes through the color point of the white point W and the color point of the input color labelled by the filled triangle; and the input color labelled by the filled rhombus is (approximately) mapped onto a color whose color point lies on a straight line G5, wherein the straight line G5 passes through the color point of the white point W and the color point of the input color labelled by the filled rhombus.

In the example shown in FIG. 5, the hue-maintaining mapping is carried out in such a way that the color point of the output color (hollow circle, hollow triangle, hollow rhombus) is a point of intersection of the edge 35 of the second gamut 37 with the corresponding straight line G3, G4, G5.

Figure 6:
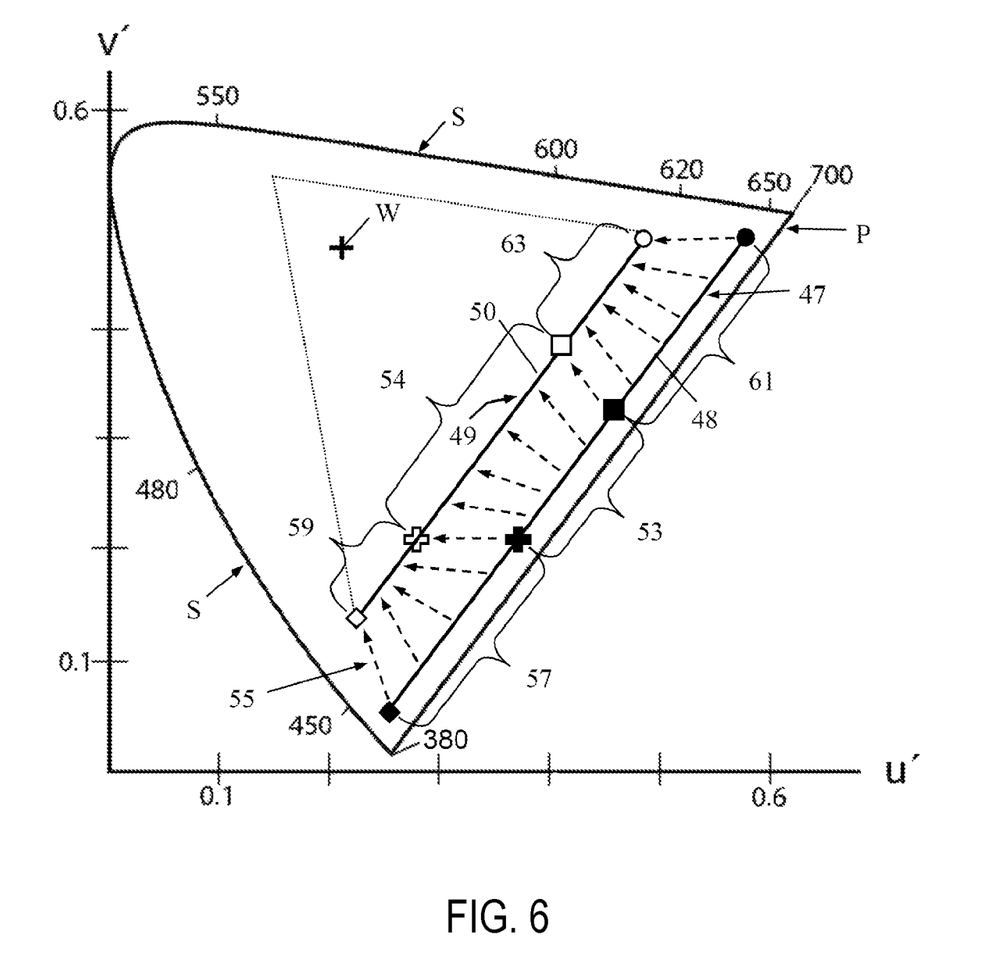
FIG. 6 shows a schematic illustration of a CIE 1976 UCS u'v' chromaticity diagram for explaining other properties of a color transfer function.

FIG. 6 shows a schematic illustration of the CIE 1976 UCS u'v' chromaticity diagram for explaining other properties of a color transfer function.

The "stretching" and "compression" of a second subset 53 of the input colors or a third subset 57, 61 of the input colors during the mapping by the color transfer function is explained with reference to FIG. 6.

The colors of the color space region 41 labelled by hatching in FIG. 4 are particularly critical for the distinction between diseased and healthy tissue. Therefore, the color transfer function can map a second subset 53 of the input colors 47 labelled by the line 48 (the second subset 53 comprises colors whose color points lie on the line 48 between the filled square and the filled cross) onto a second subset 54 of the output colors 49 labelled by the line 50 (the second subset 54 of the output colors includes colors whose color points lie on the line 50 between the hollow square and the hollow cross) in such a way that the number of distinguishable colors in the second subset 54 of the output colors (on line 50 between hollow square and hollow cross) is greater than the number of distinguishable colors in the second subset 53 of the input colors (on the line 48 between the filled square and the filled cross).

Arrows 55 represent the mapping undertaken by the color transfer function. The "stretching" of the critical colors, i.e., the colors of the second subset 53 of the input colors, can be recognized by virtue of the fact that the distances (or a mean value of the distances) between closest colors of the second subset 53 of the input colors are smaller than the distances (or a mean value of the distances) between mutually closest colors of the second subset 54 of the output colors.

The color space regions 43 and 45 labelled in FIG. 4 are non-critical for the distinction between diseased and healthy tissue as these are easy to assess. Therefore, the color transfer function can map a third subset 57 and 61 of the input colors labelled by the line 48 (the third subset 57 and 61 include colors color points of which lie on the line 48 between the filled rhombus and the filled cross and between the filled square and the filled circle) onto a third subset 59 and 63 of the output colors labelled by the line 50 (the third subset 59 and 63 of the output colors includes colors color points of which lie on the line 50 between the hollow rhombus and the hollow cross and between the hollow square and the hollow circle) in such a way that the number of distinguishable colors in the third subset 59 and 63 of the output colors is less than the number of distinguishable colors in the third subset 57 and 61 of the input colors.

The "compression" of the colors of the third subset 57 and 61 of the input colors by the color transfer function can be recognized by virtue of the fact that the distances (or a mean value of the distances) between closest colors of the third subset 57 and 61 of the input colors are greater than the distances (or a mean value of the distances) between mutually closest colors of the third subset 59 and 63 of the output colors.

It is understood that the foregoing description is that of the exemplary embodiments of the disclosure and that various changes and modifications may be made thereto without departing from the spirit and scope of the disclosure as defined in the appended claims.

What is claimed is:

1. A microscopy method comprising:
    illuminating an object with illumination light such that a fluorescent dye in the object is excited to fluoresce;
    recording a first color image of an illuminated object by a color image sensor configured to record colors of a first gamut, the first color image including pixels that each have assigned a color from the first gamut;
    generating a second color image of the object, the second color image including the pixels that each have assigned the color from a second gamut;
    depicting the second color image by a display apparatus configured to render the colors of the second gamut;
    the generating of the second color image including:
    determining the colors at the pixels of the second color image by applying the color transfer function to the colors of corresponding pixels of the first color image,
    mapping, by the color transfer function, input colors onto output colors, and
    mapping, by the color transfer function, the input colors belonging to the first gamut but not to the second gamut onto the output colors belonging to the second gamut.

2. The microscopy method according to claim 1, further comprising:
    mapping, by the color transfer function, a first subset of the input colors onto the first subset of the output colors in hue-maintaining fashion, and
    mapping, by a hue-maintaining mapping, an input color onto an output color with substantially a same hue.

3. The microscopy method according to claim 2, further comprising:
    mapping, by the hue-maintaining mapping, the input color onto the output color such that a color point of the output color in the CIE 1976 UCS u'v' chromaticity diagram has a distance of no more than $20\Delta u'v'_{limit}$ from a straight line which passes through the color point of a predetermined white point and the color point of the input color and $\Delta u'v'_{limit}=0.003$.

4. The microscopy method according to claim 3, further comprising:
    mapping, by the hue-maintaining mapping, the input color onto the output color such that the color point of the output color in the CIE 1976 UCS u'v' chromaticity diagram is a point of intersection of an edge of the second gamut with the straight line.

5. The microscopy method according to claim 1, further comprising:
    mapping, by the color transfer function, at least one input color in hue-maintaining fashion, a color point of an input color having a distance of no more than 0.1 in the CIE 1976 UCS u'v' chromaticity diagram from the color point of a spectral color with a wavelength of between 425 nm and 460 nm.

6. The microscopy method according to claim 1, further comprising:
    mapping, by the color transfer function, at least one input color in hue-maintaining fashion, a color point of an input color having a distance of no more than 0.1 in the CIE 1976 UCS u'v' chromaticity diagram from the color point of a spectral color with the wavelength of 635 nm.

7. The microscopy method according to claim 1, further comprising:
    mapping, by the color transfer function, at least one input color in hue-maintaining fashion, an input color having a complementary wavelength of between 495 nm and 575 nm.

8. The microscopy method according to claim 1, further comprising:
    mapping, by the color transfer function, a second subset of the input colors onto the second subset of the output colors, and
    wherein a number of distinguishable colors in the second subset of the output colors is larger than or equal to the number of distinguishable colors in the second subset of the input colors.

9. The microscopy method according to claim 8, wherein the second subset of the input colors includes the colors, complementary wavelengths of which lie between 510 nm and 570 nm, and color points of which lie within a color space region that is bounded by a spectral locus of the CIE 1976 UCS u'v' chromaticity diagram from 620 nm to 700 nm and from 430 nm to 470 nm, by a straight connecting line, endpoints of which correspond to the color points of spectral colors with the wavelengths of 620 nm and 470 nm on the spectral locus of the CIE 1976 UCS u'v' chromaticity diagram, and by the straight connecting line, the endpoints of which correspond to the color points of spectral colors with the wavelengths of 430 nm and 700 nm on the spectral locus of the CIE 1976 UCS u'v' chromaticity diagram.

10. The microscopy method according to claim 1, further comprising:
    mapping, by the color transfer function, a third subset of the input colors onto the third subset of the output colors, and
    wherein a number of distinguishable colors in the third subset of the output colors is less than the number of distinguishable colors in the third subset of the input colors.

11. The microscopy method according to claim 10, further comprising:
    mapping, by the color transfer function, a plurality of colors of the third subset of the input colors onto one same output color of the third subset of the output colors.

12. The microscopy method according to claim 10, wherein the third subset of the input colors includes the colors, complementary wavelengths of which are less than 510 nm or greater than 570 nm and color points of which lie within a color space region that is bounded by a spectral locus of the CIE 1976 UCS u'v' chromaticity diagram from 620 nm to 700 nm and from 430 nm to 470 nm, by a straight connecting line, endpoints of which correspond to the color points of spectral colors with the wavelengths of 620 nm and 470 nm on the spectral locus of the CIE 1976 UCS u'v' chromaticity diagram, and by the straight connecting line, the endpoints of which correspond to the color points of spectral colors with the wavelengths of 430 nm and 700 nm on the spectral locus of the CIE 1976 UCS u'v' chromaticity diagram.

13. The microscopy method according to claim 1, further comprising:

mapping, by the color transfer function, the input colors onto the output colors such that a number of distinguishable output colors is less than a number of distinguishable input colors.

14. The microscopy method according to claim 1, wherein the first color image includes the colors that belong to the first gamut but not to the second gamut.

15. The microscopy method according to claim 1, wherein the first color image includes the colors, color points of which belong to a color space region of the CIE 1976 UCS u'v' chromaticity diagram that is bounded by a spectral locus of the CIE 1976 UCS u'v' chromaticity diagram from 620 nm to 700 nm and from 430 nm to 470 nm, by a straight connecting line, endpoints of which correspond to the color points of spectral colors with wavelengths of 620 nm and 470 nm on the spectral locus of the CIE 1976 UCS u'v' chromaticity diagram, and by the straight connecting line, the endpoints of which correspond to the color points of spectral colors with the wavelengths of 430 nm and 700 nm on the spectral locus of the CIE 1976 UCS u'v' chromaticity diagram.

16. The microscopy method according to claim 1, further comprising:

filtering the illumination light by an illumination filter, a mean transmittance of which between 400 nm and 430 nm is at least 50% and the mean transmittance of which between 470 nm and 700 nm is at most 1%, and filtering light, which emanates from the illuminated object and is guided to the color image sensor, by an observation filter, the mean transmittance of which between 400 nm and 430 nm is at most 1% and the mean transmittance of which between 470 nm and 700 nm is at least 50%.

17. The microscopy method according to claim 1, wherein the fluorescent dye generates fluorescence light in a visible wavelength range, or in a wavelength range between 600 nm and 750 nm, following an excitation.

18. The microscopy method according to claim 1, wherein:

the input colors lie on a curved curve or a straight line in the CIE 1976 UCS u'v' chromaticity diagram; and/or the output colors lie on the curved curve or the straight line in the CIE 1976 UCS u'v' chromaticity diagram.

19. The microscopy method according to claim 1, further comprising:

mapping, by the color transfer function, the input colors onto the output colors such that a saturation of the output colors is approximately the same.

* * * * *